United States Patent
Heiselbetz et al.

(10) Patent No.: US 7,739,929 B2
(45) Date of Patent: Jun. 22, 2010

(54) STRUCTURAL COMPONENT, A SHIELDING COMPONENT IN PARTICULAR

(75) Inventors: Gerald Heiselbetz, Langenzenn (DE); Dieter Hofmann, Wilhermsdorf (DE)

(73) Assignee: ElringKlinger AG, Dettingen/Erms (DE)

( * ) Notice: Subject to any disclaimer, the term of this patent is extended or adjusted under 35 U.S.C. 154(b) by 1070 days.

(21) Appl. No.: 11/377,635

(22) Filed: Mar. 17, 2006

(65) Prior Publication Data
US 2006/0207545 A1 Sep. 21, 2006

(30) Foreign Application Priority Data
Mar. 19, 2005 (DE) .................. 10 2005 012 749

(51) Int. Cl.
*F16H 57/04* (2010.01)
(52) U.S. Cl. .................................................. 74/606 R
(58) Field of Classification Search ............... 74/606 R; 60/322, 323; 137/375; 138/149; 123/198 E, 123/198 C
See application file for complete search history.

(56) References Cited

U.S. PATENT DOCUMENTS

| 2,576,698 | A | * | 11/1951 | Russum | 428/75 |
| 4,576,800 | A | * | 3/1986 | Retallick | 422/180 |
| 6,090,495 | A | * | 7/2000 | Pirchl | 428/593 |

FOREIGN PATENT DOCUMENTS

DE 298 10 330 9/1998

* cited by examiner

*Primary Examiner*—Vicky A Johnson
(74) *Attorney, Agent, or Firm*—Roylance, Abrams, Berdo & Goodman, L.L.P.

(57) ABSTRACT

In a structural component (1), a shielding component in particular, with individual adjacent component sections (21, 23) that can be brought at least partially by a functional unit (25) into a definable three-dimensional position to each other along an action line. The functional unit (25) is divided into component units (27, 29, 31) enabling definable positioning along at least one further action line (29) extending at a definable distance adjacent to one action line (27).

12 Claims, 2 Drawing Sheets

Fig.1  State of the art

STRUCTURAL COMPONENT, A SHIELDING COMPONENT IN PARTICULAR

FIELD OF THE INVENTION

The present invention relates to a structural component, a shielding component in particular, with individual adjacent component sections. The component sections can be brought at least partially by a functional unit into a definable three-dimensional position relative to each other along an action line.

BACKGROUND OF THE INVENTION

While heat, such as that evolved by a high-economy, performance-optimized diesel engine, for example, can be very low on the cylinder crankshaft housing, this characteristic does not apply to "hot zones" such as in manifolds, turbochargers, catalytic converters, etc. As a result of the increasingly compact design of engines, components which are not thermally "compatible" are coming to be in ever closer proximity. Hence it is necessary to use shielding components such as heat shields to protect adjacent heat-sensitive assemblies, such as sensors, fuel lines, pressure cells, body parts, and so forth. The situation is also exacerbated by the compact structure in that the high packing density of the assemblies constricts the cooling air flow in the engine compartment. Noise abatement measures can also contribute to this problem. For example, under certain circumstances plastic floor plates having the function of reducing the level of sound emerging from the engine compartment to the roadway can produce effective insulation whereby heat is trapped in the engine compartment. Because of their high surface temperatures in some phases, catalytic converters are among the heat sources which may necessitate the use of protective shield barriers. A typical example is that of design measures of positioning the catalytic converter in the immediate vicinity of the manifold. This design principle, which performs the function of rapid heat-up of the catalytic converter, and thus of reducing emissions in the cold start phase, shifts a major source of heat into the engine compartment where a considerable number of assemblies are crowded in a tight space. Another reason for the growing importance of shielding components such as heat shields is the trend toward use of thermoplastics. Light and economical materials with their exceptional moldability are rapidly becoming common in the engine compartment, but require special attention with respect to ambient temperatures generated at the application site in connection with other heat-generating engine parts (New materials and Development Tools for Protection from Heat, in MTZ December 2001, Vol. 72, pp. 1044 et seq.).

Structural components such as shielding components in the installed state frequently form arched bodies which surround the components to be shielded in the form of a shell or pipe. In the shielding of catalytic converters, a respective heat shield can have a more or less closed tubular shape, so that shielding encompassing the heat source is formed. During installation, the component sections are moved into the required three-dimensional position in which they form the desired arched or partially closed shielding by the component sections being suitably bent along the action line.

Structural components such as shielding components of the prior art call for a deformation of the metallic material of the structural component forming a bending bead as the action line designed to enable a predetermined change of position of the component sections adjacent to the action line. As has been shown, problems however arise when the known structural components are installed. If the component sections are bent on the bending bead with a comparatively large bending angle, there is the danger of buckling of the material or lack of stiffness of the bending area as a result of overly great material stress. Increased resiliency behavior after completed bending also appears. In structural components intended for repeated installation, there is the danger that stability of shape is not ensured upon repeated installation.

SUMMARY OF THE INVENTION

An object of the present invention is to provide a structural component, a shielding component in particular, in which these problems with respect to installation and operating behavior are overcome.

This object is basically achieved according to the present invention by a structural component, a shielding component in particular, where at least one further action line extends at a definable distance adjacent to the action line. The positioning of the component sections to be moved relative to each other is effected, not on a single material part, but in two separate material areas adjacent to each other. This structure means that in any material area a smaller amount of forming occurs. As a result, less force is necessary for contoured forming. High stiffness of the bending area, stability of shape in spite of repeated installation and the danger of avoiding buckling of the material are other advantages. The tendency to resiliency is reduced. Division among several action lines also makes it possible to easily and reliably produce closed shapes of the structural component.

Preferably, the functional unit used to set the position of the component sections has two action lines extending parallel or at least approximately parallel to each other. If the action lines are formed by bending lines defined on the metallic material of the component sections, when the component sections are bent for their positioning the extent of the material deformation is then divided between two parallel bending lines extending next to each other. As a result, the expenditure of force required for bending and the danger of buckling of the material are notably reduced. In exemplary embodiments in which there is a stiffening unit placed between the bending lines as a component unit of the functional unit, the danger that a loss of stiffness will occur in the bending area, as could be feared with repeated bending, i.e., in several installation processes, is avoided.

The bending lines can have the form of bending beads formed by U-shaped stampings of the metallic material of the structural component.

In advantageous exemplary embodiments, the stiffening unit in the intermediate space between the bending beads has at least one stiffening element. The stiffening element or stiffening elements at least nearly, preferably completely, bridge the intermediate space between the bending beads.

Especially reliable stiffening occurs when there is a plurality of stiffening elements in the form of stampings of the metallic material of the structural component. Preferably, a succession of stiffness beads extend transversely to the bending beads.

The inventive configuration of the functional unit which is used to set the position of the component sections with more than one action line is especially advantageous when structural components with a more or less closed shape are to be produced, for example, shielding components which jacket a heat source, such as a catalytic converter, with tubular sections. The present invention makes it possible to produce "closed" shapes without major expenditure of force for forming.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
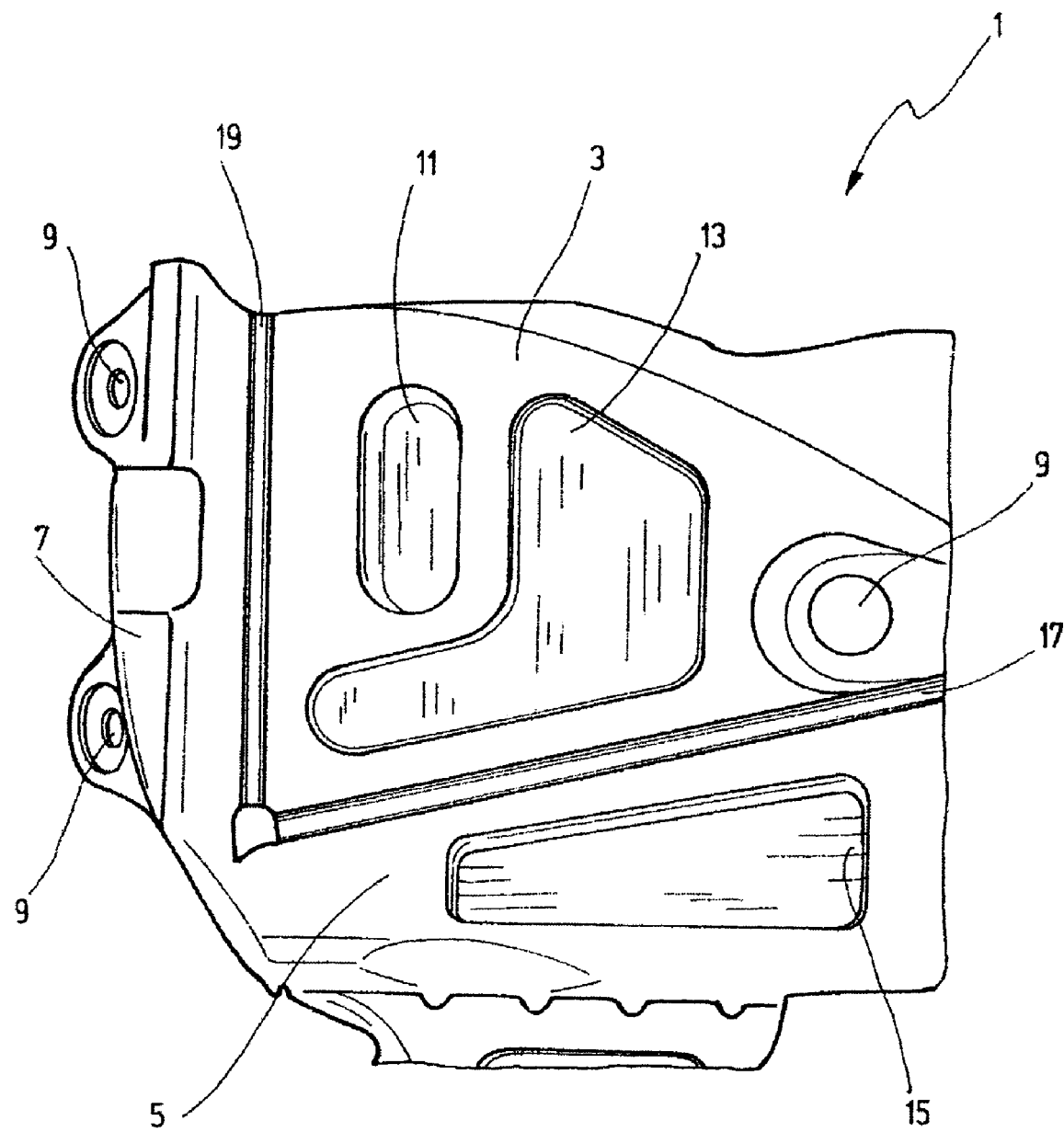
FIG. 1 is a partial, top plan view of a structural component according to the prior art in the form of a shielding component arched to form a partial shell.

FIG. 1 shows the outside of a structural component 1 according to the prior art in the form of a shielding component of metallic material arched in the form of a shell. The material is high quality steel sheet. The structural component forms a heat shield, preferably with a multilayer structure containing a heat insulation layer. In the example shown in FIG. 1, the shielding component has three component sections, a main component 3 which is for the most part flat, an arched side component 5 which is bent out of the main plane of the main component 3, and a mounting component 7 which is likewise bent relative to the main component 3 and has mounting holes 9. The main component 3 is also penetrated by a mounting hole 9. Additionally, in the main component 3 trough-like impressions 11 and 13 increase the stiffness of the main component 3 and for vibration damping. A corresponding trough-like impression 15 is located in the side component 5.

For bending the side component 5 and the mounting component 7 relative to the main component 3, bending lines extend between these component sections. The bending lines include a bending bead 17 and a bending bead 19. The bending bead 17 connecting the main component 3 to the side component 5 defines the bending line for bending of the side component 5. The bending bead 19 defines the bending line for bending of the mounting component 7.

Figure 2:
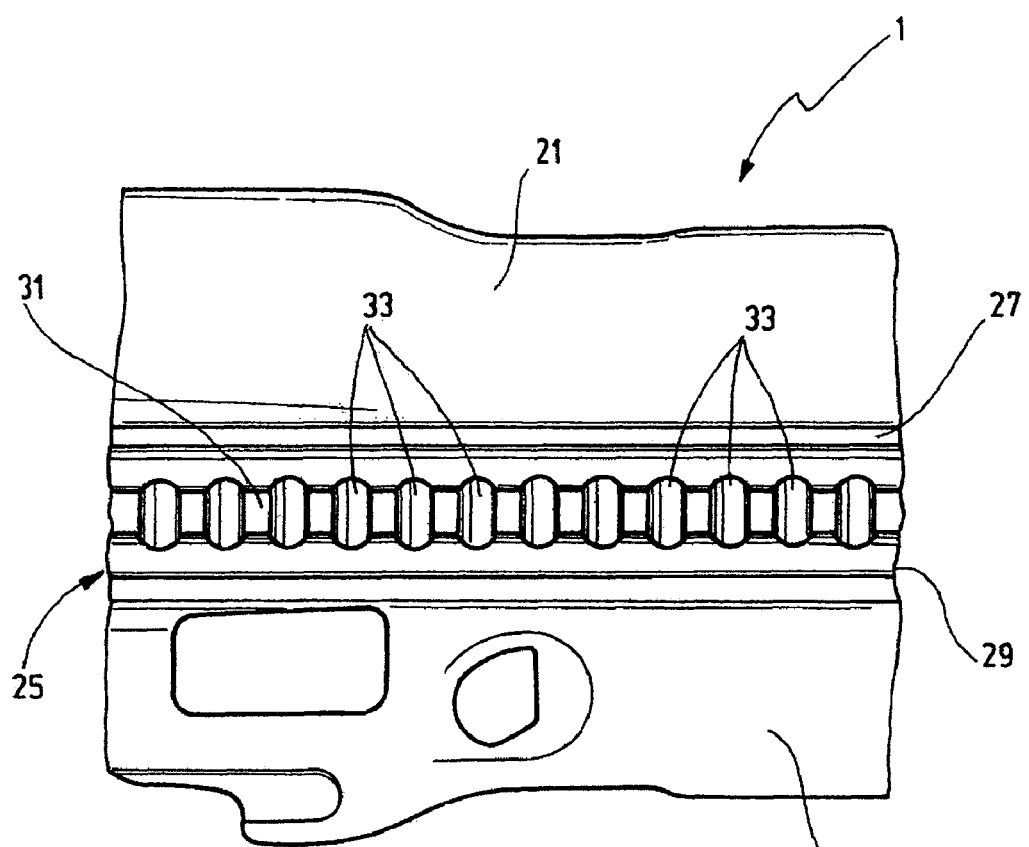
FIG. 2 is a partial, top plan view of the central part of one exemplary embodiment of the structural component according to the present invention in the form of a shielding component which can be brought into a tubular, closed shape to form a jacket shielding a heat source.
Figure 3:
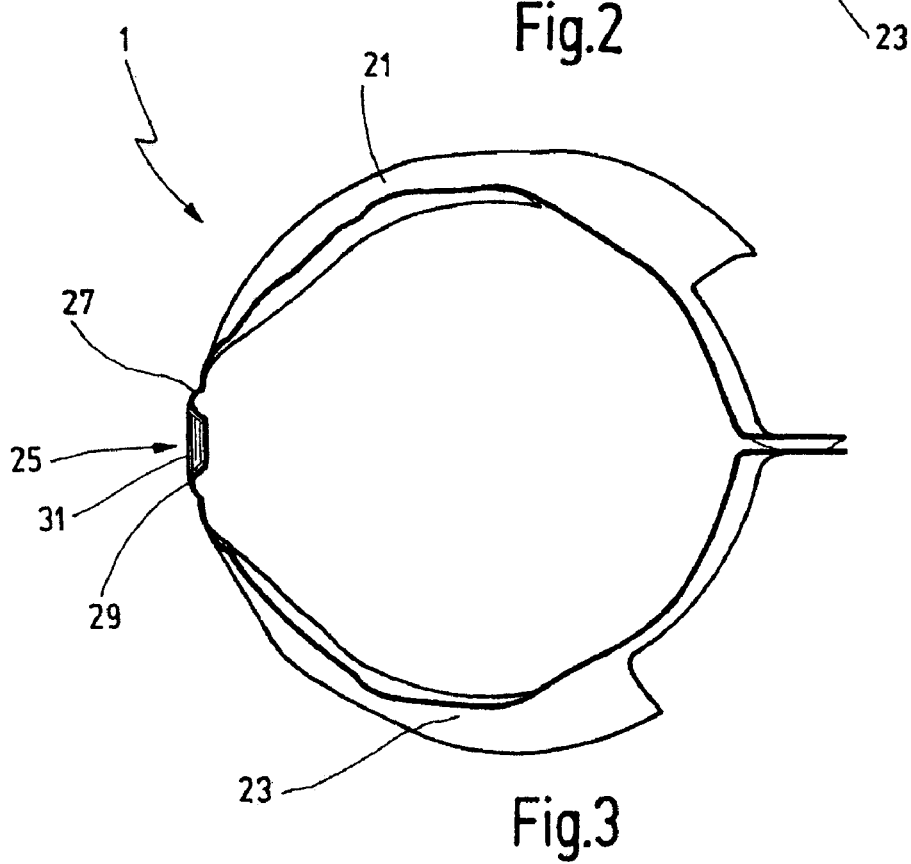
FIG. 3 is an end elevational view of an exemplary embodiment of the structural component according to the present invention with the component sections positioned to a closed tubular shape.

FIGS. 2 and 3 show one exemplary embodiment of the structural component 1 according to the present invention in the form of a shielding component intended as a heat shield for a heat source such as a catalytic converter. The structural component can be brought into the closed shape shown in FIG. 3 forming a heat shield surrounding the heat source. As in the solution shown in FIG. 1 corresponding to the prior art, the structural component 1 is formed by a laminate material with high quality steel sheets and a heat-insulating intermediate layer. Two component sections 21 and 23 each form a respective half-tubular component in the closed shape shown in FIG. 3. The component sections 21 and 23 are connected to each other by a functional unit 25. The functional unit 25 is the area along which the component sections 21 and 23 are positioned relative to each other to move the component sections 21 and 23 out of a more or less extended position into the closed shape shown in FIG. 3.

In the prior art, this positioning is effected by bending the side component 5 relative to the main component 3 on a single bending line (the bending bead 17), and by bending the mounting component 7 relative to the main component 3 on a single bending line (the bending bead 19). In the present invention the functional unit 25 serving the purpose of bending the adjoining component sections 21 and 23 is divided into component units having of two bending lines located next to each other, specifically the first bending bead 27 and a second bending bead 29. A stiffening unit 31 is located between the bending beads 27 and 29 as another component unit of the functional unit 25.

In contrast to the prior art, material forming when the component sections 21 and 23 are being bent is divided between two bending lines, by which the aforementioned advantages arise in the forming and installation of the structural component 1. The stiffening unit 31 has a close succession of stiffening beads 33 (not all shown in FIG. 2) extending transversely to the bending beads 27 and 29 in the intermediate space between them. The stiffening unit 31 thus forms a stiff bending area ensuring stability of shape in spite of repeated assembly processes (bendings). Moreover, the component sections 21 and 23 can be brought into the closed shape shown in FIG. 3 without major expenditure of force and without the danger of buckling of the material.

In place of the stiffening elements shown for the stiffening unit 31 in the form of transversely extending stiffening beads 33, differently shaped stiffening elements, for example, stampings with a shape extending obliquely to the bending beads 27, 29 or extending lengthwise thereto, or irregularly shaped stampings can be provided. It is still within the scope of the present invention to configure the two action lines 27, 29 non-parallel, especially angled to each other to achieve wedge-shaped or conical shaping of the adjacent component sections 21, 23.

While one embodiment has been chosen to illustrate the invention, it will be understood by those skilled in the art that various changes and modifications can be made therein without departing from the scope of the invention as defined in the appended claims.

What is claimed is:

1. A shielding component, comprising:
   at least first and second individual and adjacent metal component sections;
   a metal functional unit connecting said first and second component sections and allowing said first and second component sections to be located in a definable three-dimensional positions relative to each other, said functional unit including first and second bending beads extending at a distance to one another and directly connecting said functional unit to said first and second component sections, respectively, said bending beads defining ends of an intermediate space therebetween; and
   at least one stiffening element in said functional unit substantively bridging said intermediate space.

2. A shielding component according to claim 1 wherein said first and second bending beads extend substantially parallel to each other.

3. A shielding component according to claim 1 wherein said bending beads comprise U-shaped stampings.

4. A shielding component according to claim 1 wherein several stiffening elements in said functional unit substantially bridge said intermediate space.

5. A shielding component according to claim 4 wherein said stiffening elements comprise stampings in said functional unit.

6. A shielding component according to claim 5 wherein said stiffening elements comprise stiffening beads extending transversely to said bending beads.

7. A shielding component according to claim 5 wherein said stiffening elements comprise stiffening beads extending angularly to said bending beads.

8. A shielding component according to claim 1 wherein said stiffening element comprises a stiffening bead extending transversely to said bending beads.

9. A shielding component according to claim 1 wherein said stiffening element comprises a stiffening bead extending angularly relative to said bending beads.

10. A shielding component according to claim 1 wherein said first and second component sections have half-tubular shapes, are integral with each other, and are locatable into a laterally open tubular shape and a laterally closed tubular shape by bending along said bending beads; and said function unit extends lengthwise to a tube formed by said component sections.

11. A shielding component according to claim 1 wherein said stiffening element comprises a stamping in said functional unit.

12. A shielding component according to claim 1 wherein said stiffening element comprises a stiffening bead.

* * * * *